E. WARREN.
HOES.

No. 182,875. Patented Oct. 3, 1876.

Attest:
W. H. Rineke
A. C. Bradley

Inventor:
Edward Warren
By his Atty,
Geo. W. Rothwell

UNITED STATES PATENT OFFICE.

EDWARD WARREN, OF MARSHALL, MICHIGAN, ASSIGNOR TO GEORGE INGERSOLL, OF SAME PLACE.

IMPROVEMENT IN HOES.

Specification forming part of Letters Patent No. 182,875, dated October 3, 1876; application filed April 29, 1875.

*To all whom it may concern:*

Be it known that I, EDWARD WARREN, of Marshall, in the county of Calhoun and State of Michigan, have invented new and useful Improvements in Hoes, of which the following is a specification:

My invention relates to a hoe for general use, which is adapted to carry the soil in hilling, planting, grading, &c., and forms an improved implement for transplanting shrubs and plants, the plant being taken bodily, dirt and all, on the blade, and directly deposited from the blade to the place prepared for it. My hoe also forms an improved surface-dresser, and affords good clearance in working in soddy ground.

My invention consists in the combination of a concave, pointed, or heart-shaped hoe-blade, rearwardly-curved goose-neck, and doubly-curved handle, as hereinafter described.

My invention further consists in the combination of a rearwardly-curved goose-neck with a concave sagittate blade, the wings of which extend above the handle, as and for the purpose specified.

Figure 1:
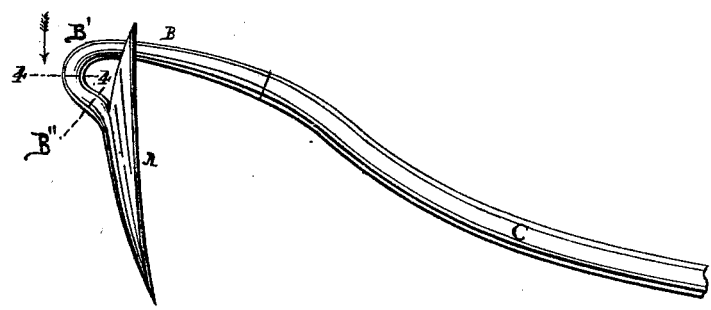
Figure 2:
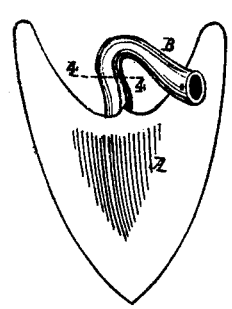
Figure 4:
Figure 3:
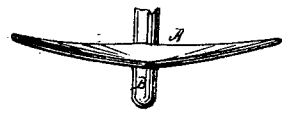

In the accompanying drawings, Figure 1 is a side elevation of the improved hoe, only part of the handle being shown. Fig. 2 is a perspective view, the handle being omitted. Fig. 3 is an edge view of the same, looking from the point. Fig. 4 is a transverse section of the goose-neck on the line 4 4, Fig. 1, showing the cutting-edge.

Similar letters of reference indicate like parts in the different figures.

A represents a hoe-blade of heart shape, or wide at the top and tapering downward to a point, as shown in Fig. 2, the transverse and vertical or longitudinal planes of which are concave, or, in other words, the whole inner surface of which is "dished." By this construction the blade can be more easily ground and polished, and will remain so in use much longer than the ordinary hoes, and when used in transplanting garden-plants the earth is retained around the roots, thus keeping the plants in better condition, and allowing of the same being more readily set. The blade is provided with a short goose-neck tang, B, having a socket, or its equivalent, in its end to receive the handle. The hooked portion of the goose-neck is in rear of the blade, and is provided in front with a cutting-edge to prevent the catching of roots, weeds, and trash. The tang is extended its usual length by a peculiarly-constructed handle, C. This handle is made of wood, steamed and bent in substantially the form shown in Fig. 1. By having the handle thus bent the line of draft is brought nearly to the center of the blade, and greater space is obtained between them, and hence plants of larger size can be carried on the blade than is possible on other hoes; and in working in soddy ground a good clearance from clods, &c., is gained, whereby the labor is lessened. Further, the hoe is rendered less costly in manufacture by reducing the amount of steel or metal required by reducing the length of the goose-neck tang, while its strength and durability is in no wise impared by the substitution of wood. The goose-neck being securely attached at its inner end to the top of the blade A at the back, forms a space or passage, B″, on either side of the hook B′ and the blade.

Having thus described my invention, what I claim as new, and desire to secure by Letters Patent, is—

1. The combination of doubly-curved handle C, rearwardly-curved goose-neck B, and concave, pointed, or heart-shaped hoe-blade A, substantially as and for the purpose set forth.

2. The combination of the rearwardly-curved goose-neck with the concave sagittate blade, the wings of which extend above the handle, as and for the purposes specified.

To the above specification of my invention I have signed my name this 27th day of February, A. D. 1873.

EDWARD WARREN.

Witnesses:
 OTTO LEE JOHNSON,
 GEORGE INGERSOLL.